3,576,907
METHOD OF PRODUCING MIXED FILAMENTS OF POLYIMIDES AND POLYETHER-POLYESTERS
Isao Kimura, Osaka, Fumimaro Ogata, Nishinomiya, and Katsuhiko Nagamine, Takatsuki, Japan, assignors to Kanegafuchi Boseki Kabushiki Kaisha, Tokyo, Japan
Filed Jan. 22, 1968, Ser. No. 699,733
Claims priority, application Japan, Jan. 26, 1967, 42/5,181; Feb. 13, 1967, 42/9,363
Int. Cl. C08g *41/04*
U.S. Cl. 260—857                                   25 Claims

ABSTRACT OF THE DISCLOSURE

Production of mixed filaments, which comprises melt blending fiber forming polyamide component, polyester-ether component and polyester component, an amount of the polyamide component being 97 to 50% by weight based on the total amount of the mixture, a ratio of the polyester component to the polyester-ether component being 0/100–95/5 (by weight) and spinning and drawing the resulting blend. The resulting mixed filaments have highly improved tenacity, dyeing affinity, elasticity, instant resilience and elasticity recovering percentage for elongation, and a low permanent deformation. The dispersibility, spinnability and drawability are excellent in said production.

The present invention relates to a method of producing thermoplastic synthetic linear polymer mixed filaments consisting of polyamide component and polyester-ether component or in combination with polyester component.

Polyamide fibers have been manufactured in a commercial scale as so-called "nylon" and used in a wide application. The polyamide fibers are generally excellent in tenacity, dyeability and hygroscopicity and further are low in the melting point and crystallization degree, so that they have an improved melt spinnability and drawability, while they have drawbacks in elasticity, such as, initial modulus, hardness in bending, etc. and in heat resistance and light resistance. The largest drawback consists in a low initial modulus and the fabric of polyamide fibers has waxy and cool touch and poor in covering property, so that it is necessary to eliminate these drawbacks in order to develop a more wide field in clothings.

A method has been heretofore proposed, wherein two or more synthetic polymers having different physical and chemical properties are mix spun to improve dyeability, initial modulus, hygroscopicity, and heat resistance of the fiber. Namely, this is a polymer blend process in which two or more synthetic polymers are mixed to compensate each drawback to obtain a new type polymer, but mixed filaments obtained by such a process has not been practised, because said process has still a large number of problems.

In the mix spinning, it is most essential that the components to be mixed are melted completely with each other or have such a good compatibility that they are dispersed homogeneously, do not cause unmixing and separation into layers even after left to stand for a certain period of time, nor derive the defects of depolymerization, coloration and foaming due to the mixing and further have improved mix spinnability and drawability.

Polyamide and polyester, which have been commercially produced widely as typical thermoplastic synthetic linear polymers which can form fiber by melt-spinning process, are considerably different in the chemical structure and physical properties, so that they have opposite advantages and disadvantages with each other. In general, polyamide is more excellent in tenacity and dyeability than polyester. However, the initial modulus of nylon-6 and nylon-66 among polyamide fibers is 140 to 300 kg./mm.$^2$, while that of polyethylene terephthalate fiber among polyester fibers is 700 to more than 1,000 kg./mm.$^2$.

A method for producing mixed filament has been recently proposed, in which polyamide and polyester having considerably opposite properties in the physical and chemical properties, such as dyeability, initial modulus, hygroscopicity, heat resistance, spinnability and drawability are melt blended and spun to obtain mixed filament having both the properties of said polyamide and polyester and further unique properties which have never been observed in these sole polymers.

Japanese patent application publication No. 26,208/65 has disclosed a process for melt blending and spinning polyamide and polyester, wherein these polymers are spun while stirring and mixing directly mechanically by means of an extruder in order to prevent the unmixing and separation into layers after melt blended and coloration and decrease of viscosity due to the mixing reaction of both the polymers, but it is difficult to blend and disperse these polymers thoroughly by a conventional extruder and unevenness of fineness and yarn breakage occur in spinning and drawing owing to the insufficient mixing and dispersing.

Furthermore, Belgian Pat. Nos. 661,784 and 675,292 have disclosed that polyamide and polyester are mix spun in a finely divided form in order to improve the blending and dispersing of both the polymers, but it is very difficult to pulverize these high molecular weight fiber forming polymers by a mechanical means and it is difficult to mix spin these finely divided polymers by a conventional extruder. Moreover, when aromatic polyester previously used in mix spinning, which has ester linkage and is obtained by polycondensing dibasic acid, such as polyethylene terephthalate with glycol, and polyamide are melt blended, considerable depolymerization and coloration occur and the mix spinning can not be effected satisfactorily. In the above described Belgian patent there is described that polyamide, the terminal amino groups of which are less than 40% of the total terminal groups of the polyamide, is mix spun in order to prevent the coloration and viscosity change resulting from reaction of the terminal amino groups of polyamide and the terminal groups of polyester in the melt blending, but in such a process the terminal amino groups of polyamide are considerably limited, so that the good dyeability, which is the most important characteristic of polyamide, is decreased and therefore, the dyeability of the mixed filament is considerably decreased.

As mentioned above, when polyamide and polyester are melt blended, both the polymers are poor in the compatibility and the unmixing and separation into layers occur after the blending and the viscosity is decreased owing to the depolymerization of polyester, so that it is necessary to blend and homogenize the polyamide and polyester in such a very short time that the depolymerization of polyester is not caused, in order to obtain a favorable mixed filament in a rate of polyester of more than 10% by weight.

On the other hand, so-called "polyester-ether," in which molecules having ester linkage and ether linkage are arranged regularly, has unique properties due to the ether linkage in addition to the conventional properties of polyester. For example, polyethyleneoxybenzoate fiber is more light than polyethylene terephthalate and has a constant tensile strength and elongation in dry and wet conditions and further excellent tenacity and elongation. Particularly, the elasticity recovering percentage for elongation is highly excellent and the initial modulus is between those of polyethylene terephthalate fiber and nylon fiber and the weather resistance and fatigue resistance are good.

The inventors have found that when the polyester-ether having such properties and polyamide are melt blended, the compatibility of these polymers is more excellent than that of polyamide and polyester and the unmixing and separation into layers after the blending, the depolymerization of the mixed polymers due to the melt blending and the coloration do not occur, and further various systematic investigations have been made in detail with respect to mixed filament consisting of three components of polyamide, polyester-ether and polyester in order to obtain mixed fiber having a high elasticity, such as initial modulus and hardness in bending and as the result, it has been found that the blend consisting of polyamide and polyester-ether containing a specific mixture ratio of polyester does not cause defects of decrease of viscosity, coloration, foaming, etc. in the melt blending and has a very good dispersibility and that when said mixture is subjected to a melt-spinning widely practised, the spinnability and the drawability are excellent and fibers having the strength and dyeability, which are characteristics in polyamide and the initial modulus and hardness in bending, which are superior to those of conventional polyamide, can be obtained and further the initial modulus is increased in proportion to the mixture ratio of polyester.

An object of the present invention is to provide a novel synthetic fiber, which retains excellent tenacity and dyeability of polyamide fiber substantially and has considerably improved initial modulus and hardness in bending as compared with those of polyamide fiber.

A further object is to provide a novel fiber, which provides with an instant resilience shown by polyester fiber and a low permanent deformation shown by polyamide fiber together and has an extremely excellent elasticity recovering percentage for repeated elongation.

An additional further object is to provide a commercially advantageous method for producing the above described fiber from polyamide, polyester-ether and, and if necessary, polyester without attending defects of decrease of viscosity, coloration and foaming and with improved dispersibility, spinnability and drawability.

The other object will be obvious by the following descriptions:

According to the present invention, the fiber forming thermoplastic synthetic linear polyamide, polyester-ether and polyester are melt blended and spun and drawn in such amount ratios of said three components that the amount of polyamide is 97 to 50% by weight based on the total mixture and the ratio of the polyester component to the polyester-ether component is within the range of 0:100 to 95:5 (by weight).

As polyamides to be used in the present invention, mention may be made of fiber forming thermoplastic synthetic linear polymers containing at least 90 mol percent of aliphatic polyamide, such as polycaprolactam, polyhexamethyleneadipamide, polyhexamethylenesebacamide, etc. and further copolymers obtained by copolymerizing said polyamides with up to 10 mol percent of lactams, such as caprolactam, enantholactam, laurolactam, etc. aminocarboxylic acids, such as aminocaproic acid, aminodecanoic acid, p-aminomethylbenzoic acid, etc. or nylon salts of diamines, such as hexamethylene diamine, nonamethylene diamine, undecamethylene diamine, m-xylylene diamine, p-xylylene diamine, etc. with dibasic acids, such as adipic acid, sebacic acid, isophthalic acid, terephthalic acid, etc.

As the useful polyesters to be used in the present invention, mention may be made of fiber forming thermoplastic synthetic linear polymers containing at least 90 mol percent of polyethylene terephthalate obtained by polycondensing ethylene glycol with terephthalic acid or the ester derivatives thereof and further copolymers obtained by copolymerizing up to 10 mol percent of different glycol or acid component, such as diethylene glycol, tetramethylene glycol, decamethylene glycol, etc. and isophthalic acid, hexahydroterephthalic acid, adipic acid, sebacic acid, etc. instead of the above described ethylene glycol and terephthalic acid respectively.

The polyester-ethers to be used in the present invention involve fiber forming thermoplastic synthetic linear polymers, in which ester linkage and ether linkage are repeated regularly in the main chain, for example, self-condensates of aromatic oxyacids as shown by the molecular formulae of or the lower alkyl esters thereof, or polycondensates of aromatic dicarboxylic acids having ether linkage as shown by the molecular formulae of or the lower alkylesters thereof with glycols, such as ethylene glycol, tetramethylene glycol, decamethylene glycol, etc. Among the above, self-condensates of p-β-hydroxyethoxybenzoic acid or the alkylesters thereof are most preferable.

The polyester-either to be used in the present invention may be the above described homopolyester-ethers and further copolyester-ethers of these polymers with polyester, if said copolyester-ethers contain ester linkage and ether linkage together in the main chain.

These copolyester-ethers can be produced by coexisting the starting materials of said polyester-ether in polycondensation of glycol, such as ethylene glycol, tetramethylene glycol, decamethylene glycol, etc. with terephthalic acid or the lower alkyl esters thereof, or by melt blending polyester-ether and polyester, which are separately polymerized and copolymerizing them and said copolyester-ether contains ether linkage and ester linkage in the main chain.

The amount of the polyamide component, when the polyamide component is melt blended with the polyester-ether component and the polyester component according to the present invention, is preferably 97 to 50% by weight, more particularly, 95 to 70% by weight.

When the mixture ratio of the polyamide component is less than 50% by weight, the properties of polyester-ether and polyester prevail in the resulting blended polymer rapidly and loses the properties of polyamide and the tenacity and the dyeability for acid dye are decreased, and further the blending and dispersing property is liable to become heterogeneous and the spinning and drawing are effected with difficulty, so that an excellent mixed filament cannot obtained.

Furthermore, when the mixture ratio is more than 97%, the initial modulus of the resulting mixed filament is not substantially different from that of the polyamide fiber and the improvement of initial modulus cannot be recognized, so that such a ratio is not preferable.

For a better understanding of the invention the reference is made to the accompanying drawings, wherein.

Figure 1:
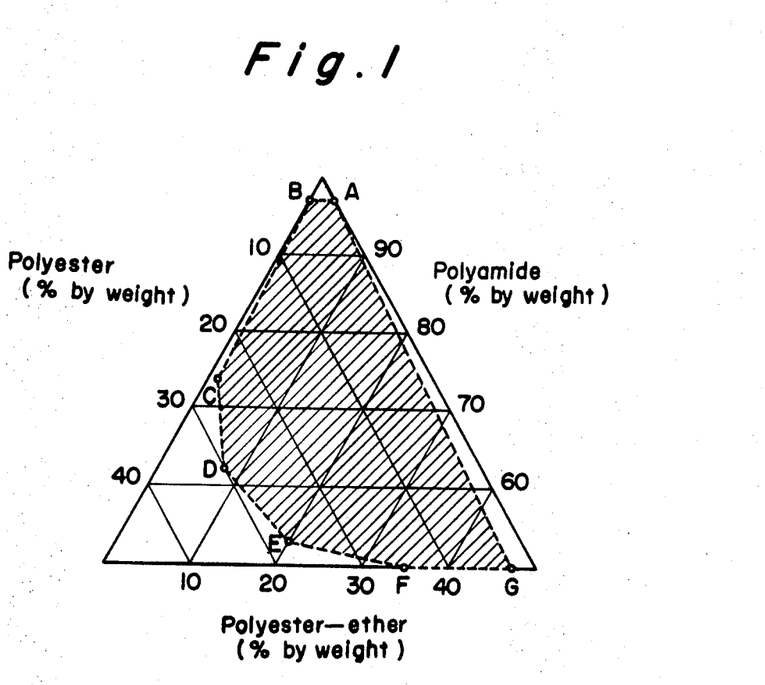
FIG. 1 is a composition diagram showing the preferable mixture ratios of each component of the mixed synthetic filament according to the present invention.

The preferable embodiments of the present invention involve melt blending the three components of polyamide, polyester and polyester-ether having the composition shown by a point within the hatched portion in FIG. 1, that is, the range surrounded by dotted line connecting points A, B, C, D, E, F and G, the composition of which are shown in the following Table 1, in said order, and then spinning the melt blended components.

TABLE 1

| | Components, percent by weight | | |
|---|---|---|---|
| | Polyamide | Polyester | Polyester-ether |
| Point: | | | |
| A | 97 | 0.15 | 2.85 |
| B | 97 | 2.85 | 0.15 |
| C | 74 | 25 | 1 |
| D | 62 | 30 | 8 |
| E | 53 | 27 | 20 |
| F | 50 | 15 | 35 |
| G | 50 | 2.5 | 47.5 |

The ratio of the polyester component to the polyester-ether component in the blend of these preferable embodiments is shown within the range constituted by the line connecting points A and B and lines connecting points B, C, D, E and F. Namely, the ratio of the polyester component to the polyester-ether component is 5/95–95/5 (by weight), preferably, 10/90–90/10 (by weight).

When the ratio of polyester component is less than 5% by weight, from said blend is obtained a mixed filament having yarn property, which is substantially not different from that of two component mixed filament composed of polyamide and polyester-ether.

When the polyester-ether component is less than 5% by weight, the defects of decrease of viscosity and coloration occur, so that the ratio of the poly-ether component must be not less than 5% by weight.

The shape of the thermoplastic synthetic polymer or thermoplastic synthetic copolymer to be blended in the present invention may be chip or powder and further it is possible to mix powder polymer with chip type polymer.

The blending process may be attained by mix spinning directly the polymers in chip state through an extruder, but in order to obtain a particularly homogeneous blend, every thermoplastic synthetic linear polymer may be blended thoroughly by means of a melt blending device equipped with a stirrer and then the resulting blend be directly melt spun. Alternatively, the resulting blend may be formed into mixed chip and then the resulting chip is subjected to a conventional heat grid-type melt spinning process.

In the above explanation, there has been described a process, wherein the polyamide component, the polyester component and the polyester-ether component are mixed separately in chip state or powdery state and then melt blended, but a further excellent result can be obtained by melt blending the polyamide component with the copolyester-ether, which has previously obtained by copolymerizing the monomers of the polyester component and the monomers of the polyester-ether component to be mixed with the polyamide component.

Namely, another preferable embodiment of the present invention involves melt blending the fiber forming synthetic linear polyamide component with the previously copolymerized copolyester-ether containing the aromatic oxyacid component or the aromatic dicarboxylic acid component having ether linkage and then spinning and drawing the resulting blend.

The ratio of the above described aromatic oxyacid component or the above described aromatic dicarboxylic acid component having ether linkage occupied in the total acid components in the copolyester-ether is 8 to 95 mol. percent, preferably 10 to 90 mol percent. If the ratio is less than 8 mol percent, the amount of the component having stable ether linkage occupied in the copolyester-ether is smaller and the amount of the component of ester linkage, which is very unstable in the blending with the polyamide component, occupies a major portion, so that said blend derives the same defects as in the conventinal blending of polyamide and polyester and shows similar high melting point and difficult dyeing affinity to those of the conventional polyethylene terephthalate, so that such a ratio is not preferable. On the other hand, when the ratio is more than 95 mol percent, the amount of the component having a stable ether linkage occupied in the copolyester-ether is larger and the amount of the component having ester linkage is smaller, so that the defects of decrease of viscosity and coloration in the blending do not appear, but the viscosity is considerably increased in the blending, so that the spinning and drawing properties becomes inferior and the melting point is increased and further the dyeing affinity is decreased. Therefore, such a ratio is not preferable.

Thus, as mentioned above, when the ratio of the aromatic oxyacid component or the aromatic dicarboxylic acid component having ether linkage occupied in the total acid component in the copolyester-ether is 8 to 95 mol percent in the melt blending of the polyamide component with the copolyester-ether component, the copolyester-ether component is considerably stabilized in the blending with the polyamide component, so that it is possible to remove completely the defects of variation of the polymerization degree, coloration and foaming. Moreover, it is possible to obtain the mixed polymer having an improved quality and a stable viscosity not only in a conventional short time melt blending process but also in a long time blending process and further the homogenous blend and dispersion, which is a problem in the conventional short time blending process, can be solved.

Furthemore, the copolyester-ether has lower melting point and specific gravity than those of the polyethylene terephthalate heretofore used, so that when said copolyester-ether is melt blended with aliphatic polyamide generally having low melting point and specific gravity, the defects of separation into layers and unmixing in the melt blending can be prevented and further the melt blending can be effected at a low temperature.

Further, the copolyester-ether is lower in the crystallization degree than that of homopolymer, such as polyethylene terephthalate, so that said copolyester-ether is easily dyed. As to the copolyamide component, even if the copolyester-ether component is reacted with the polyamide component, the viscosity is very stable, so that it is not necessary to limit a number of the terminal amino groups in the polyamide as in the conventional process. Accordingly, the dyeing affinity for the acid dye can be satisfactorily increased.

The copolyamide component, the polyester component and the polyester-ether component to be used in the present invention can be produced by polymerizing while heating the statring materials composing said polymers by conventional known processes.

The temperature suitable for blending the polyamide component with the polyester component and the polyester-ether component, or the copolymer thereof is higher than the melting point of these polymers and preferably a temperature higher 10 to 30° C. than the melting point which is highest in the melting point amoung these polymers.

The time necessary for blending these polymers can be properly selected depending upon the kind, the shape, the polymerization degree, the mixture ratio of the polymers to be blended, and the blender, but it is desirable to mix these polymers in a short time as far as possible considering coloration due to oxidation and viscosity stability of the mixed polymers.

Furthermore, in case of blending and spinning, it is desirable to make the water content of these polymers less than 0.1% by weight in order to prevent decrease of viscosity and foaming of the polymers.

According to the mix spinning process of the present invention, it is possible to effect the mix spinning directly by means of a conventional extruder because of excellent blendability, compatibility, viscosity stability and coloration stability and alternatively it is possible to form previously mixed chips by means of a melt blending device equipped with a stirrer or a conventional extruder and then to melt spin the mixed chips easily with a heat grid.

Furthermore, it is possible to incorporate various additives, such as delustrants, pigments, light resistants, heat resistants etc. in the mixed filament obtained according to the present invention.

Thus, according to the present invention, a novel mixed filament having improved spinnability and drawability, compatibility, blending and dispersing property and viscosity stability and further considerably decreased unmixing property, separation into layers, depolymerization and coloration, can be easily obtained from polyamidic and polyesteric polymers having considerably different physical and chemical properties. The resulting fiber retains the tenacity and dyeing affinity of nylon and has a proper flexible resilient elasticity and no cool touch and further provides with an instant resilience of the conventional polyester fiber and a low permanent deformation of nylon in combination, and moreover is extremely excellent in the elasticity recovering percentage for repeated elongation.

The synthetic fiber according to the invention can be used widely for clothings such as knitted goods, woven fabrics, pile products and ornaments, and industrial materials, as continuous filament and staple fiber.

The invention will be explained in more detail with reference to the following examples. In the examples, "Part" means by weight.

EXAMPLE 1

As a polyamide, use was made of polycaprolactams (hereinafter abridged as P.C.L.) having an intrinsic viscosity ($\eta$) of 1.17 in m-cresol at 30° C., terminal amino groups of 55 milliequivalent/kg., and terminal carboxyl groups of 80 milliequivalent/kg., which was manufactured in a conventional polymerization process by using acetic acid as a viscosity stabilizer.

As a polyester-ether, use was made of polyethyleneoxybenzoate (hereinafter abridged as P.E.O.B.) having a melting point of 220° C. and an intrinsic viscosity ($\eta$) of 0.58 in o-chlorophenol at 30° C., which was obtained in such a manner that 100 parts of methyl p-($\beta$-hydroxyethoxy)benzoate, 0.02 part of zinc acetate, 0.15 part of antimony trioxide were primarily polycondensed at 230° C. for 3 hours under nitrogen atmosphere in an autoclave, and then polycondensation was effected by keeping the reaction system at 250° C. under a reduced pressure of 70 mm. Hg for 3 hours while blowing dry gaseous nitrogen into the autoclave from the bottom and further keeping the system at 280° C. under a reduced pressure of less than 1 mm. Hg for 5 hours.

The above described dried polymer chips were mixed in the mixture ratio as shown in the following Table 2. Then the mixed chips were charged into an autoclave equipped with a stirrer, heated and melted at 270° C. for 3 hours under dry nitrogen atmosphere, after which the melts were stirred and blended for 1 hour. The resulting blends were left to stand for 30 minutes to effect defoamation and then extruded from the bottom of the autoclave into guts at 260° C., which were then formed into blended polymer chips, Experiment Nos. 1–7.

The above mentioned blended polymer chips Nos. 1–7 and the above mentioned polycaprolactam chip for a contrast were spun respectively through an extruder of 25 mm$\phi$ provided with 18 orifices, each diameter of said orifice being 0.3 mm$\phi$, at an orifice temperature of 260–280° C. and then hot drawn 3.8 times its original length on a drawing pin at 80° C. to obtain a mixed filament.

The result is shown in Table 2.

TABLE 2

| Experiment number | Blended component | | Intrinsic viscosity in m-cresol at 30° C. | Spinnability and drawability | Yarn property | | | |
|---|---|---|---|---|---|---|---|---|
| | P.C.L. | P.E.O.B. | | | Fineness (denier) | Tenacity (grams/denier) | Elongation (percent) | Initial modulus (grams/denier) |
| Nylon-6 | 100 | 0 | 1.16 | Excellent | 70.1 | 6.1 | 32.7 | 19.7 |
| 1 | 98 | 2 | 1.18 | ___do___ | 70.2 | 6.0 | 30.2 | 19.8 |
| 2 | 95 | 5 | 1.20 | ___do___ | 70.2 | 5.9 | 29.1 | 23.6 |
| 3 | 90 | 10 | 1.24 | ___do___ | 69.8 | 5.8 | 28.6 | 26.7 |
| 4 | 80 | 20 | 1.19 | ___do___ | 71.4 | 5.6 | 25.8 | 30.3 |
| 5 | 70 | 30 | 1.08 | ___do___ | 71.7 | 5.3 | 28.4 | 38.4 |
| 6 | 50 | 50 | 0.97 | ___do___ | 70.8 | 4.7 | 26.3 | 40.4 |
| 7 | 40 | 60 | 0.86 | Difficult | 72.5 | 4.0 | 22.1 | 48.6 |

NOTE.—In the above table, "intrinsic viscosity in m-cresol at 30° C." relates to the blended polymer chips.

Among the above described mixed filaments, Experiment Nos. 2–6 according to the invention retain the dyeing affinity of nylon-6 and have higher elasticity than that of nylon-6. However, the contrast Experiment No. 7 containing a large amount of polyester-ether component looses property of nylon-6 and has a lower dyeing affinity for acid dye and is heterogeneous in the blending and the dispersing property, so that spinning and drawing are difficult and uniform filament can be hardly obtained. The contrast Experiment No. 1 containing small amount of polyester-ether component has substantially the same initial modulus as that of nylon-6, and the effect for improving the property as that of nylon-6 by the melt blending of P.E.O.B. does not appear at all.

EXAMPLE 2

As a polyamide, use was made of (A) a copolyamide (6/6T) composed of 90 parts of caprolactam and 10 parts of hexamethylenediaminoterephthalate, (B) a copolyamide (6/6I) composed of 90 parts of caprolactam and 10 parts of hexamethylenediaminoisophthalate, or (C) a copolyamide (6/66) composed of 90 parts of caprolactam and 10 parts of hexamethylenediaminoadipate. Into an autoclave of 8 l. capacity equipped with a stirrer were charged 2.7 kg. of each above mentioned copolyamide and melted at 260° C. under dry nitrogen atmosphere, and 0.3 kg. of polyethyleneoxybenzoate (P.E.O.B.) used in Example 1 was added thereto while stirring. The resulting mass was stirred and blended for 1 hour. The resulting blend was left to stand for 30 minutes to effect defoamation and then the bottom of the autoclave at a extrusion rate of 30 g./min. at the same temperature and then formed into blended polymer chips.

The above mentioned blended polymer chips were spun through an extruder of 25 mm$\phi$ provided with 18 orifices, each diameter of said orifice being 0.3 mm., at a orifice temperature of 260° C. and then drawn 3.8 times its original length to obtain a mixed filament of 70 d./18f. The spinnability, the drawability and the yarn property of the resulting mixed filament are shown in Table 3.

TABLE 3

| Experiment number | Copoly- amide to be blended | Spinna- bility and draw- ability | Yarn property | | | |
|---|---|---|---|---|---|---|
| | | | Fine- ness (denier) | Tenacity (grams/ denier) | Elon- gation (percent) | Initial modulus (grams/ denier) |
| 8 | 6/6T | Excellent | 70.8 | 5.2 | 30.4 | 29.5 |
| 9 | 6/6I | ----do---- | 72.3 | 4.7 | 38.6 | 23.3 |
| 10 | 6/66 | ----do---- | 71.5 | 5.4 | 27.3 | 28.6 |

EXAMPLE 3

As a polyamide, use was made of polyhexamethylene adipamide (nylon-66) having an intrinsic viscosity $[\eta]$ of 1.00 in m-cresol at 30° C., which was prepared by a conventional polymerization process.

As a polyester-ether, use was made of a crystalline polyester-ether (P.E.N.) having a melting point of 230° C. and an intrinsic viscosity $[\eta]$ of 0.48 in o-chlorophenol at 30° C., which was prepared in such a manner that 125 parts of 1,5-naphthalene-bis-($\beta$-oxyethyl ether), 122 parts of diphenyl oxalate, 0.016 part of antimony trioxide and 0.02 part of zinc acetate were primarily polycondensed at 200° C. for 3 hours under nitrogen atmosphere in an autoclave, then the temperature was raised to 230° C. within 1 hour, and further raised to 260° C. in 3 hours under a reduced pressure of 70 mm. Hg while blowing purified nitrogen from the bottom of the autoclave, after which this temperature was maintained for 3 hours, and further for 4 hours under a reduced pressure of 1 mm. Hg, whereby the polymerization reaction was completed.

Polyamide chip of the above mentioned nylon-66 was charged into an autoclave of 8 l. capacity, heated and melted at 300° C. for 3 hours under dry nitrogen atmosphere while stirring, after which the above mentioned P.E.N. chip of polyester-ether was added thereto in the mixture ratio as shown in the following Table 4, and then the resulting mixture was stirred and melt blended at the same temperature for 1 hour. Then the resulting blend was left to stand for 30 minutes to effect defoamation, then spun directly from the bottom of the autoclave at 290° C. through a spinneret provided with 18 orifices, each diameter of said orifice being 0.3 mm., at a temperature of 290° C. and hot drawn 4.0 times its original length on a drawing pin at 80° C. to obtain a mixed filament. The result is shown in the following Table 4.

EXAMPLE 4

Mix spinning was effected in the same manner as described in Example 3 to obtain a mixed filament having an excellent initial modulus, except that use was made of a polyester-ether (hereinafter abridged as P.P.B.) having an intrinsic viscosity $[\eta]$ of 0.42 in o-chlorophenol at 30° C. and a melting point of 238° C., which was prepared by polycondensing 430 parts of 1,4-bis(phenoxymethyl) benzene-4,4'-dicarboxylic acid diethylester with 130 parts of ethylene glycol in the presence of 0.02 part of zinc acetate and 0.015 part of antimony trioxide. The result is shown in Table 5.

TABLE 5

| Experiment number | Blended component (percent by weight) | | Intrinsic viscosity in m-cresol at 30° C. | Yarn property | | | |
|---|---|---|---|---|---|---|---|
| | Nylon-66 | P.E.B. | | Fineness (denier) | Tenacity (grams/ denier) | Elongation (percent) | Initial modulur grams/denies |
| 14 | 97 | 3 | 0.986 | 72.3 | 5.4 | 28.5 | 25.2 |
| 15 | 90 | 10 | 0.932 | 68.9 | 5.0 | 24.6 | 30.4 |
| 16 | 80 | 20 | 0.867 | 69.2 | 4.5 | 20.6 | 31.6 |

EXAMPLE 5

Into an autoclave of 8 l. capacity equipped with a stirrer were charged 2.7 kg. of P.C.L. chip having an intrinsic viscosity $(\eta)$ of 1.21 in m-cresol at 30° C. and heated and melted at 270° C. in 3 hours under dry nitrogen atmosphere while stirring, after which 0.3 kg. of mixture of polyethylene terephthalate chip (hereinafter abridged as P.E.T.) having an intrinsic viscosity $(\eta)$ of 0.68 in o-chlorophenol at 30° C. and P.E.O.B. chip having an intrinsic viscosity $(\eta)$ of 0.63 in o-chlorophenol, the mixture ratio of P.E.T. to P.E.O.B. being shown in the following Table 6, was added thereto. The resulting mixture was stirred and blended for 1 hour at this temperature. Then the resulting blend was left to stand for 30 minutes to effect defoamation and extruded from the bottom of the autoclave at an extruding rate of 30 g./min. at the same temperature to obtain blended polymer chips.

The mixture ratio of the above mentioned P.E.T. to P.E.O.B. and the viscosity stability and the coloration stability of the resulting blended polymer chips composed of P.C.L., P.E.T. and P.E.O.B. are shown in the following Table 6.

TABLE 6

| Experiment number | P.E.T./ P.E.O.B. (weight ratio) | Intrinsic viscosity | | Coloration stability of blended polymer chip | |
|---|---|---|---|---|---|
| | | Starting stage in extrusion | Final stage in extrusion | Starting stage in extrusion | Final stage in extrusion |
| 17 | 0/100 | 1.37 | 1.40 | White | White. |
| 18 | 5/95 | 1.29 | 1.31 | ----do---- | Do. |
| 19 | 20/80 | 1.23 | 1.24 | ----do---- | Do. |
| 20 | 50/50 | 1.17 | 1.18 | ----do---- | Do. |
| 21 | 80/20 | 0.99 | 0.97 | ----do---- | Do. |
| 22 | 95/5 | 0.95 | 0.90 | ----do---- | Do. |
| 23 | 100/0 | 0.78 | 0.66 | Yellow | Yellow. |

Note.—In Table 6, "intrinsic viscosity" shows "limiting viscosity member in m-cresol at 30° C." Those described in the following Tables 7-11 have the same meanings.

As seen from Table 6, the blended polymer chips of Experiment Nos. 17, 18, 19, 20, 21 and 22 according to

TABLE 4

| Experiment number | Blended component (percent by weight) | | Intrinsic viscosity in m-cresol at 30° C. | Yarn property | | | |
|---|---|---|---|---|---|---|---|
| | Nylon-66 | P.E.N. | | Fineness (denier) | Tenacity (grams/ denier) | Elongation (percent) | Initial modulus (grams/denier) |
| 11 | 97 | 3 | 0.988 | 68.9 | 5.3 | 28.3 | 26.8 |
| 12 | 90 | 10 | 0.980 | 71.2 | 5.0 | 25.4 | 33.2 |
| 13 | 80 | 20 | 0.942 | 71.8 | 4.7 | 20.7 | 35.3 |

Note.—In the above table, the "intrinsic viscosity in m-cresol at 30° C." relates to blended polymer.

the invention are superior to the blended polymer chip of Experiment No. 23 in the viscosity stability, and coloration does not occur in them.

The above mentioned blended polymer chips of Experiment Nos. 17–23 and P.C.L. chip were spun respectively through an extruder of 25 mm$\phi$ provided with 18 orifices, each diameter of said orifice being 0.3 mm., at an orifice temperature of 260–280° C. and then hot drawn 3.8 times its original length on a drawing pin at 80° C. to obtain a mixed filament of 70 d./18f.

The spinnability, drawability and yarn property of the obtained mixed filament are shown in Table 7.

TABLE 7

| Experiment number | Spinnability | Drawability | Yarn property | | | |
|---|---|---|---|---|---|---|
| | | | Fineness (denier) | Tenacity (grams/ denier) | Elongation (percent) | Initial modulus (grams/ denier) |
| Nylon-6 | Excellent | Excellent | 70.3 | 5.6 | 30.4 | 21.2 |
| 17 | do | do | 71.6 | 5.4 | 28.9 | 24.6 |
| 18 | do | do | 72.1 | 5.4 | 29.2 | 30.5 |
| 19 | do | do | 68.5 | 5.2 | 27.4 | 32.7 |
| 20 | do | do | 70.5 | 4.6 | 30.3 | 31.6 |
| 21 | do | do | 69.8 | 4.8 | 26.9 | 35.8 |
| 22 | do | do | 71.2 | 4.2 | 25.8 | 37.7 |
| 23 | (¹) | (¹) | | | | |

¹ Impossible due to low viscosity.

EXAMPLE 6

In this example use was made of the same polycaprolactam (P.C.L.), polyester (P.E.T.) and polyesterether (P.E.O.B.) as used in Example 5.

Blended polymer chips were prepared and the obtained blended polymer chips were extrusion spun and drawn to obtain a mixed filament of 70 d./18f. in the same manner as described in Example 5, except that the mixture ratio (weight ratio) of P.E.T. to P.E.O.B. was kept at 1:3 and the mixture ratio of P.C.L. to P.E.T.-P.E.O.B. was varied as shown in the following Table 8.

TABLE 8

| Blended component (percent by weight) | | Intrinsic viscosity of blended polymer chip | Spinnability and drawability | Yarn property | | | |
|---|---|---|---|---|---|---|---|
| Nylon 6 | P.E.T.- P.E.O.B. | | | Fineness (denier) | Tenacity (grams/ denier) | Elongation (percent) | Initial modulus (grams/ denier) |
| 100 | 0 | 1.21 | Excellent | 70.3 | 5.8 | 30.4 | 21.2 |
| 99 | 1 | 1.21 | do | 70.5 | 5.8 | 30.8 | 21.0 |
| 97 | 3 | 1.20 | do | 70.1 | 5.6 | 30.0 | 23.8 |
| 90 | 10 | 1.18 | do | 71.8 | 5.4 | 26.8 | 33.5 |
| 70 | 30 | 1.02 | do | 70.5 | 5.2 | 25.6 | 40.7 |
| 50 | 50 | 0.90 | do | 70.7 | 5.1 | 23.7 | 57.6 |
| 45 | 55 | 0.72 | Slightly poor | 71.5 | 4.8 | 25.4 | 48.6 |
| 40 | 60 | 0.64 | Poor | | | | |

As seen from Table 8, when the content of P.E.T.-P.E.O.B. in the mixed filament is less than 3% by weight, the initial modulus of the obtained yarn is substantially the same to that of nylon-6, while when the content of P.E.T.-P.E.O.B. is more than 50% by weight, the blended polymer is low in viscosity and is poor in the spinnability, so that mixed filaments having satisfactory yarn properties cannot be obtained. On the contrary, the initial modulus of the mixed filaments obtained according to the present invention is considerably improved as compared with that of nylon-6, because the blended polymer of the present invention is excellent in viscosity stability and spinnability.

EXAMPLE 7

The blended chips were prepared by using the same P.C.L., P.E.T. and P.E.O.B. as used in Example 5 in the mixture ratio of said three components as described in the following table and the resulting blended chips were subjected to extrusion spinning and drawing in the same manner as described in Example 5.

The result is shown in Table 9.

TABLE 9

| Blended component (percent by weight) | | | Intrinsic viscosity of blended chip | Spinnability and drawability | Yarn property | | | |
|---|---|---|---|---|---|---|---|---|
| P.C.L. | P.E.T. | P.E.O.B. | | | Fineness (denier) | Tenacity (grams/ denier) | Elongation (percent) | Initial modulus (grams/ denier) |
| 97 | 0.15 | 2.85 | 1.23 | Excellent | 71.5 | 5.5 | 27.6 | 24.8 |
| 97 | 2.85 | 0.15 | 1.19 | do | 70.8 | 5.3 | 25.8 | 25.0 |
| 74 | 25 | 1 | 0.98 | Good | 72.2 | 4.8 | 24.3 | 40.7 |
| 70 | 29 | 1 | 0.87 | Poor | | | | |
| 62 | 30 | 8 | 0.95 | Good | 72.0 | 4.4 | 22.3 | 43.6 |
| 53 | 27 | 20 | 1.08 | Excellent | 70.5 | 4.9 | 26.7 | 39.2 |
| 50 | 30 | 20 | 0.89 | Slightly poor | | | | |
| 50 | 20 | 30 | 0.93 | do | | | | |
| 50 | 15 | 35 | 0.99 | Good | 71.2 | 5.1 | 25.1 | 35.4 |
| 50 | 2.5 | 47.5 | 1.07 | do | 70.1 | 5.3 | 28.6 | 30.6 |

EXAMPLE 8

As polyester, use was made of copolyester (hereinafter abridged as C.P.E.T.) having an intrinsic viscosity ($\eta$) of 0.56 in o-chlorophenol and a melting point of 242° C., which was obtained in such a manner that 90 parts of dimethyl terephthalate, 10 parts of dimethyl isophthalate, 0.1 part of dimethyl 2-hydroxyisophthalate, 90 parts of ethylene glycol, 0.02 part of zinc acetate and 0.02 part of antimony trioxide were reacted at 190° C. for 4 hours and methanol was distilled off and then the temperature was raised to 240° C. to distil off an excess amount of ethylene glycol and then further raised while reducing pressure and the polymerization was effected at 280° C. under a reduced pressure of 1 mm. Hg for 6 hours. As polyamide and polyester-ether, uses were made of the same polycaprolactam and polyethyleneoxybenzoate as used in Example 5. Said three components were blended in the given mixture ratio as described in the following table and the resulting blend was subjected to extrusion spinning and drawing to obtain a mixed filament. The result is shown in Table 10.

TABLE 10

| Blended component (percent by weight) | | | Intrinsic viscosity of blended chip | Spinnability and drawability | Yarn property | | | |
|---|---|---|---|---|---|---|---|---|
| P.C.L. | C.P.E.T. | P.E.O.B. | | | Fineness (denier) | Tenacity (grams/ denier) | Elongation (percent) | Initial modulus (grams/ denier) |
| 97 | 2 | 1 | 1.20 | Excellent | 70.1 | 5.7 | 31.5 | 23.6 |
| 90 | 7 | 3 | 1.18 | do | 69.6 | 5.5 | 28.9 | 27.4 |
| 80 | 10 | 10 | 1.10 | do | 69.5 | 5.4 | 28.6 | 32.5 |
| 70 | 2 | 28 | 1.12 | do | 70.3 | 5.2 | 24.2 | 31.3 |
| 60 | 5 | 35 | 1.18 | do | 71.9 | 4.8 | 20.6 | 41.7 |

EXAMPLE 9

As polyester-ether, use was made of polyester-ether (P.E.E.) having an intrinsic viscosity $[\eta]$ of 0.53 in o-chlorophenol at 30° C. and a melting point of 238° C., which was obtained in such a manner that 430 parts of 1,4-bis(phenoxymethyl) benzene-4,4'-dicarboxylic acid dimethylester, 130 parts of ethylene glycol, 0.02 part of zinc acetate and 0.015 part of antimony trioxide were primarily polycondensed in an autoclave under nitrogen atmosphere at 200° C. for 3 hours and then the temperature was raised to 230° C. in one hour and further raised to 260° C. in 3 hours and during this reaction the purified nitrogen was blown from the bottom of said autoclave. The polycondensation was further effected at the same temperature for 3 hours and then under a reduced pressure of 1 mm. Hg for 2 hours.

As polyamide, use was made of polyhexamethylene adipate (nylon-66) obtained by a conventional method and having an intrinsic viscosity $[\eta]$ of 1.16 in m-cresol at 30° C. As polyester, use was made of the same P.E.T. as used in Example 5. The mixed filament was produced by using said three components in the same manner as described in Example 6. The result is shown in Table 11.

of calcium acetate and antimony oxide and then effecting polycondensation under a reduced pressure.) Then the resulting mass was blended at the same temperature under a reduced pressure of 300 mm. Hg for one hour while stirring at a revolution speed of 50 r.p.m. and then the resulting blend was left to stand at a temperature of 265° C. for 30 minutes to effect defoamation and then extruded in gut state to obtain chips for 30 minutes. The resulting chips were washed with water and dried. The relation between the relative viscosity $\eta_r$ in sulfuric acid of the chips obtained in the starting stage and the final stage in said extrusion and the content of P.E.O.B. in the copolymer is shown in FIG. 2.

Figure 2:
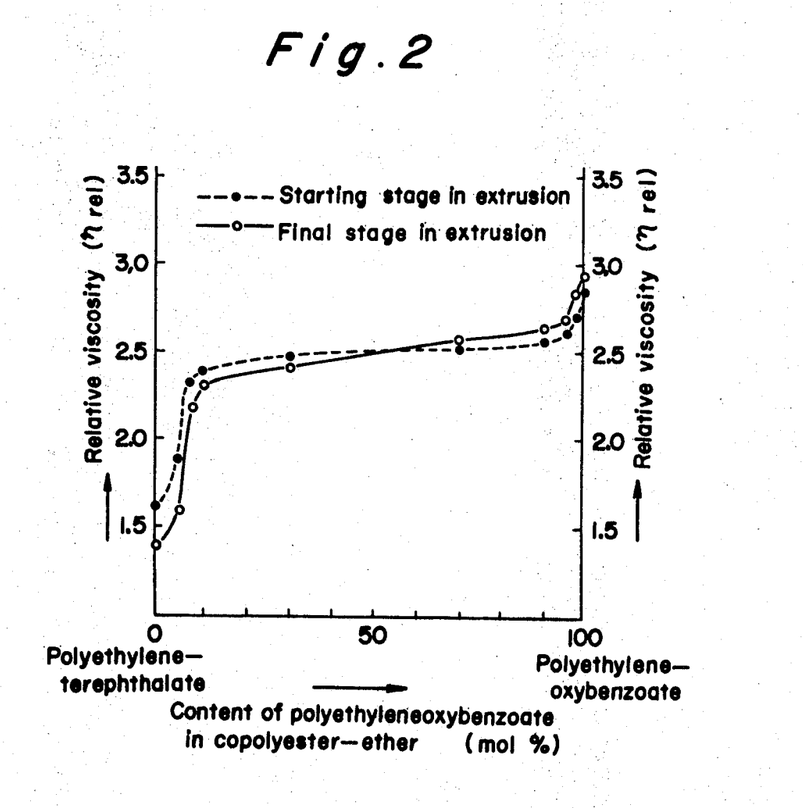
FIG. 2 is a diagrammatic view showing a relation of the relative viscosity of the blended polymer to be used in the present invention to the content of polyethyleneoxybenzoate in the copolyester-ether component forming said blended polymer.

As seen from FIG. 2, when the copolymerization ratio (mol ratio) of P.E.O.B. to P.E.T. in the copolyester-ether is within the range of 8:92–95:5, preferably 10:90 to 90:10 in both the starting stage and the final stage in extrusion, the relative viscosity is stable.

In said blending process, the contents of copolyester-ether in both the blended chips in the starting stage and the final stage in said extrusion were measured in order to determine the degree of unmixing caused in the extrusion owing to the variation of the copolymerization

TABLE 11

| Blended component (percent by weight) | | Intrinsic viscosity of blended chip | Spinnability and drawability | Yarn property | | | |
|---|---|---|---|---|---|---|---|
| Nylon-66 | P.E.T.-P.E.E. | | | Fineness (denier) | Tenacity (grams/ denier) | Elongation (percent) | Initial modulus (grams/ denier) |
| 99 | 1 | 1.16 | Excellent | 70.3 | 5.6 | 30.3 | 22.8 |
| 97 | 3 | 1.15 | do | 71.2 | 5.8 | 29.8 | 25.4 |
| 90 | 10 | 1.11 | do | 71.6 | 4.9 | 22.4 | 30.7 |
| 70 | 30 | 0.97 | do | 72.8 | 4.4 | 19.6 | 45.5 |

It can be seen from Table 11 that when the content of P.E.T.-P.E.E. is less than 3% by weight, yarn properties of the obtained filaments are substantially the same to those of nylon-66, while when the content of P.E.T.-P.E.E. is not less than 3% by weight, the blended polymer is more excellent in spinnability and consequently the resulting mixed filaments have an excellent initial modulus.

EXAMPLE 10

5.4 kg. of dried polycaprolactam chips (relative viscosity in 96% sulfuric acid at 30° C. $\eta_r=2.72$, terminal amino groups of 33 milliequivalent/kg.) were charged into an autoclave having an inner diameter of 160 mm. and a capacity of 10 l. and equipped with a stirrer and melted by heating at a temperature of 280° C. for 3 hours and then to the resulting melt were added 600 g. of various dried copolyester-ether chips of P.E.O.B. and P.E.T. having the copolymerization ratio as described in the following table (an intrinsic viscosity $[\eta]$ of 0.58 in o-chlorophenol at 30° C., obtained by primarily subjecting a mixture of p-β-oxyethoxybenzoic acid methyl-ratio in the copolyester-ether to be used. The result is shown in Table 12. Also, the melting points of the copolyester-ether and the polycaprolactam chip used and the coloration stability of the resulting chip are shown in Table 12.

In Table 12, the content of the copolyester-ether in the blended chip was measured as follows.

About 20 g. of the dried blended chips were weighed accurately and then charged into a three-necked flask of 300 cc. provided with a stirrer, a condenser and an inlet for an inert gas, to which concentrated hydrochloric acid containing 4 mol of hydrochloric acid per 1 mol of the starting material of the polyamide component in the blended chip was added and then the resulting mixture was heated at a temperature of 130° C. under nitrogen atmosphere while stirring for 10 hours, whereby the polyamide component was completely hydrolysed and water-solubilized. Thereafter, the resulting mass was diluted with 500 cc. of water and then the copolyester-ether not dissolved in hydrochloric acid was filtered off and dried and then the content was measured.

TABLE 12

| Experiment number | Copolymerization [1] | Melting point (° C.) | Extrusion stage | Content [2] | Dyeing affinity |
|---|---|---|---|---|---|
| 24 | 100/0 | 218 | Starting stage / Final stage | 10.0 / 10.1 | White. / Do. |
| 25 | 97/3 | 215 | Starting stage / Final stage | 10.1 / 9.9 | Do. / Do. |
| 26 | 95/5 | 210 | Starting stage / Final stage | 10.2 / 9.9 | Do. / Do. |
| 27 | 90/10 | 203 | Starting stage / Final stage | 10.1 / 9.8 | Do. / Do. |
| 28 | 70/30 | 181 | Starting stage / Final stage | 10.2 / 9.8 | Do. / Do. |
| 29 | 30/70 | 220 | Starting stage / Final stage | 10.3 / 9.7 | Do. / Do. |
| 30 | 10/90 | 237 | Starting stage / Final stage | 9.6 / 10.3 | Do. / Do. |
| 31 | 8/92 | 239 | Starting stage / Final stage | 10.6 / 9.4 | Do. / Do. |
| 32 | 5/95 | 255 | Starting stage / Final stage | 11.4 / 8.5 | Do. / Light yellow. |
| 33 | 0/100 | 258 | Starting stage / Final stage | 12.6 / 7.3 | Yellow. / Do. |
| Polycaprolactam | | 218 | | | |

[1] Ratio in copolyesterether P.E.O.B./P.E.T. (mol ratio).
[2] Of polyethylene terephthalate, polyesterether or copolyesterether in blended chip (percent).

As seen from Table 12, when the copolymerization ratio of P.E.O.B. to P.E.T. is less than 8:92 (mol ratio), the difference of the melting point between the polycaprolactam and the copolyester-ether increases considerably, so that the variation of the content of copolyester-ether in the starting stage and the final stage in said extrusion increases and further the coloration of the blended chip thus obtained is considerable.

EXAMPLE 11

The blended chips of the starting stage and the final stage in the extrusion in Experiment Nos. 24–33 were blended thoroughly respectively and then melt extruded through a conventional type extruder of 20 mm$\phi$ under conditions of screw temperature of 280° C., die temperature of 270° C., orifices of 0.2 mm$\phi$ x 18 and takeup velocity of 500 m./min., thereafter heat drawn to 4.4 times their original length on a heat pin at 70° C. to obtain a bundle of mixed filaments of 70 d./18f. Yarn properties, spinnability and drawability of the mixed filament thus obtained are shown in Table 13.

EXAMPLE 12

Polyethylene terephthalate was copolymerized with 10 mol percent of polyethylene sebacate (hereinafter abridged as P.E.S.) or polyethyleneisophthalate (hereinafter abridged as P.E.I.) respectively to produce copolyesters P.E.S./P.E.T. and P.E.I./P.E.T. having no ether linkage in the main chain. Both the resulting copolyesters and polycaprolactam were melt blended and extruded through an extruder respectively.

Said copolyester P.E.S./P.E.T. and P.E.I./P.E.T. had substantially the same melting point as that of copolyester-ether obtained in Experiment No. 30 of Example 10, so that the phenomena of unmixing and separation into layers of said copolyester component did not occur in the preparation of the blended chip, but said copolyesters were constituted only by ester linkages, which are unstable in the blending with polyamide, so that the blended chip thus obtained was notable in the decrease of viscosity and the coloration and therefore said blended chips could not be subjected to extrusion spinning and the fiber-formability was not found.

EXAMPLE 13

Polycaprolactam used in Example 10 and P.E.O.-P.E.T. copolymer used in Example 10, which consists of 12 mol percent of P.E.O.B. and 88 mol percent of P.E.T. and has an intrinsic viscosity [$\eta$] of 0.62 in o-chlorophenol at 30° C. were melt blended while stirring in the given mixture ratio (weight ratio) as described in the following table in the same manner and condition as described in

TABLE 13

| Experiment Number | Spinnability | Drawability | Fineness (denier) | Tenacity (grams/denier) | Elongation (percent) | Initial modulus (grams/denier) |
|---|---|---|---|---|---|---|
| 24 | Excellent | Excellent | 70.3±0.3 | 5.4 | 28.9 | 24.6 |
| 25 | do | do | 70.0±1.1 | 5.5 | 28.7 | 26.0 |
| 26 | do | do | 70.1±0.4 | 5.5 | 24.6 | 29.5 |
| 27 | do | do | 69.9±0.2 | 5.4 | 25.5 | 29.4 |
| 28 | do | do | 70.1±0.3 | 5.2 | 26.0 | 30.7 |
| 29 | do | do | 70.2±0.4 | 5.3 | 26.1 | 30.9 |
| 30 | do | do | 70.2±0.6 | 5.1 | 27.7 | 31.5 |
| 31 | do | do | 70.3±1.2 | 4.8 | 29.0 | 31.9 |
| 32 | do | do | 70.5±2.3 | 4.2 | 26.4 | 29.1 |
| 33 | Impossible | | | | | |
| Nylon-6 | Excellent | Excellent | 70.1±0.2 | 5.4 | 28.5 | 19.7 |

In Table 13, nylon-6 means the filament obtained by spinning and drawing polycaprolactam chip used in Example 10 solely under the same conditions as described above.

Example 10 to prepare blended chips respectively, and thereafter the resulting blended chips were subjected to extrusion spinning and drawing in the same manner and condition as described in Example 11 to obtain a bundle of mixed filaments of 70 d./18f. Yarn proporeties and dyeing affinity of said mixed filament are shown in Table 14.

The dyeing test was effected as follows.

One gram of the yarn was dipped into 100 cc. of a solution containing 0.0003 g./cc. of acid dye, Coomassie Ultra Sky SE (produced by I.C.I.) and then acetic acid was added to adjust to pH to 3, after which the temperature was gradually raised from room temperature to 95° C. in 30 minutes and thereafter the same temperature was maintained for 30 minutes and the percentage of dyestuff absorbed finally was determined, which was shown as dyeing percentage.

TABLE 14

| Mixture ratio (Percent by weight) | | Yarn property | | | | |
|---|---|---|---|---|---|---|
| Poly-capro-lactam | P.E.O.B.-P.E.T. | Fineness (denier) | Tanacity (grams/denier) | Elongation (percent) | Initial modulus (grams/denier) | Dyeing percentage (percent) |
| 100 | 0 | 70.1 | 5.4 | 28.5 | 19.7 | 92 |
| 99 | 1 | 70.0 | 5.5 | 27.6 | 19.8 | 91 |
| 97 | 3 | 70.3 | 5.4 | 28.1 | 22.5 | 90 |
| 95 | 5 | 70.1 | 5.5 | 27.7 | 26.7 | 87 |
| 90 | 10 | 70.2 | 5.2 | 27.6 | 31.8 | 82 |
| 70 | 30 | 69.9 | 5.1 | 25.1 | 54.2 | 70 |
| 60 | 40 | 70.0 | 5.3 | 25.6 | 68.0 | 77 |
| 50 | 50 | 70.5 | 5.2 | 24.0 | 71.7 | 60 |
| 40 | 60 | 70.8 | 5.0 | 26.3 | 79.8 | 28 |

As seen from Table 14, when the ratio of the copolyester-ether in the mixed filament is lens than 3% by weight, the major part of the mixed filament is the polyamide component, so that said filament has substantially the same excellent dyeing affinity as that of the polycaprolactam filament, but yarn properties, particularly initial modulus, are not improved at all. However, when the ratio of the copolyester-ether is more than 3% by weight, initial modulus is considerably improved in the proportion to the mixture ratio. However, when said ratio is more than 50% by weight, the influence of the copolyester-ether on the total mixed filament increases, so that initial modulus is improved, but dyeing affinity decreases remarkably and therefore such a ratio is not suitable.

EXAMPLE 14

90% by weight of the polycaprolactam used in Example 10 or other two polycaprolactam having the same viscosity as described in Example 10, the numbers of the terminal amino groups of which are digerent from that described in Example 10 as shown in the following table, were blended thoroughly with 10% by weight of the copolyester-ether or the polyethylene terephthalate used in Experiment Nos. 31 and 33 of Example 10 in chip state and then the resulting blend was extruded through the extruder used in Example 11 under conditions of cylinder temperature of 280° C., die temperature of 270° C. and single orifice of 2 mm$\phi$ and cooled immediately into gut, which was formed into chips, and then the resulting chips were washed with water and dried to obtain blended chips. The number of terminal amino groups in the polycaprolactam used and the relative viscosity of the resulting blended chip in 96% sulfuric acid at 30° C. are shown in Table 15.

TABLE 15

| Experiment Number | Number of terminal amino groups[1] | Copolyester-ether[2] | Relative viscosity of belnded chip in sulfuric acid |
|---|---|---|---|
| 34 | 50 | P.E.T. | 1.95 |
| 35 | 33 | P.E.T. | 2.11 |
| 36 | 15 | P.E.T. | 2.30 |
| 37 | 50 | P.E.O.B.-P.E.T. | 2.45 |
| 38 | 33 | P.E.O.B.-P.E.T. | 2.48 |
| 39 | 15 | P.E.O.B.-P.E.T. | 2.53 |

[1] In polycaprolactam (milli-equivalent/kg.).
[2] (P.E.O.B.-P.E.T.) or polyethylene terephthalate (P.E.T.).

As seen from Table 15, in a conventional blending process which uses polyethylene terephthalate constituting only of ester linkage, the viscosity of the resulting blended chips varies considerably depending upon the number of terminal amino groups in polycaprolactam to be used, while in the process of the present invention which uses the copolyester-ether having ether linkage which has an exect for stabilizing viscosity when reacting with polycaprolactam, the variation of the viscosity due to the number of terminal amino groups in polycapraloctam to be used does not occur substantially.

EXAMPLE 15

Each of the blended polymer chips of Experiment Nos. 34–39 obtained in Example 14 was melt spun by a heat grid under the following conditions, that is a heat-grid temperature of 280° C., an orifice temperature of 270° C., a residence time of polymer of 30 minutes and a diameter of orifice of 0.25 mm$\phi$, and hot drawn 4.2 times its original length on a drawing pin at 70° C. to obtain a monofilament of 15 deniers. The yarn property and the dyeing affinity of the resulting mixed filament determined in the same manner as described in Example 13 are shown in Table 16.

TABLE 16

| Experiment number | Spinnability and drawability | Fineness (denier) | Tenacity (grams/denier) | Elongation (percent) | Initial modulus (grams/denier) | Dyeing percentage (percent) |
|---|---|---|---|---|---|---|
| 34 | Spinning is impossible due to low viscosity | | | | | |
| 35 | Spinnability is relatively excellent, but yarn breakage occurs often at drawing. | | | | | |
| 36 | Spinnability is excellent, but yarn breakage occurs slightly at drawing | 14.2 | 2.6 | 30.1 | 28.1 | 77 |
| 37 | Both spinnability and drawability are excellent | 15.2 | 4.2 | 29.0 | 30.1 | 93 |
| 38 | do | 15.1 | 4.5 | 29.0 | 30.1 | 84 |
| 39 | do | 15.1 | 4.5 | 28.3 | 30.6 | 79 |
| Contrast Nylon-6 | do | 15.1 | 4.6 | 28.5 | 17.5 | 82 |

The term "contrast nylon-6" means a filament obtained by spinning polycaprolactam used in Experiment No. 35 by means of a heat-grid and drawing in the same manner and under the same condition as described above.

The mixed filaments of Experiment Nos. 37–39, particularly that of No. 37, in Table 16 are excellent in both initial modulus and dyeing affinity, and such an improved mixed filament could not be obtained in a conventional process.

EXAMPLE 16

The following various polyamides and copolyester-ethers were melted and blended in a mixture ratio of 95:5 (weight ratio) in the same autoclave in the same manner and under the same condition as described in Example 10 to prepare blended polymer chips. Then the blended polymer chip obtained at the starting stage in said extrusion was subjected to extrusion spinning and drawing to obtain a multifilament of 70 d./18f. in the same manner and condition as described in Example 11. The yarn property of the resulting mixed filament and the content of the copolyester-ether component in the mixed filament are shown in the following Table 17.

Used polyamide (1) Polycaprolactam (abridged as nylon-6) used in Example 17.

(2) Polyhexamethylene adipamide (abridged as nylon-66) having a relative viscosity $\eta_r$ of 2.54 in 96% sulfuric acid at 30° C.

(3) Copolyamide having a relative viscosity of $\eta_r$ of 2.74 in 96% sulfuric acid at 30° C., which was prepared by heating and copolymerizing 90 mol percent of caprolactam with 10 mol percent of hexamethylene diammonium adipate (abridged as nylon-6/nylon-66).

(4) Copolyamide having a relative viscosity $\eta_r$ of 2.73 in 96% sulfuric acid at 30° C., which was prepared by heating and copolymerizing 95 mol percent of caprolactam with 5 mol percent of hexamethylene diammonium terephthalate (abridged as nylon 6/6T).

Used copolyester-ether (1) Polyethyleneoxybenzoate-polyethylene terephthalate copolyester-ether (abridged as P.E.O.B.-P.E.T.) having 18 mol percent of oxybenzoate component in the main chain as described in Example 10.

(2) The similar copolyester-ether as described in Example 10 obtained by using 3-methoxy-4-β-oxyethoxybenzoic acid methylester instead of p-β-oxyethoxybenzoic acid methylester.

The content (mol percent) of the aromatic oxyacid component in the main chain is the same as that in the above described (1) (abridged as P.M.O.B.-P.E.T.).

(3) Copolyester-ether having an intrinsic viscosity of [η] of 0.51 in o-chlorophenol at 30° C. and containing 18 mol percent of aromatic dicarboxylic acid component having ether-linkage in the main chain obtained by subjecting 1,2-(bis-4-carboxymethyl-phenoxy) ethane and dimethyl terephthalate and ethylene glycol to ester interchange reaction in the presence of mixed catalyst of antimony oxide and calcium acetate, and then effecting polycondensation under a reduced pressure (abridged as P.P.O.B.-P.E.T.).

TABLE 17

| Polyamide | Copolyester-ether | Relative viscosity of blended polymer chip | Content[1] | Fineness (denier) | Tenacity (grams)/denier | Elongation (percent) | Initial modulus (grams)/denier |
|---|---|---|---|---|---|---|---|
| Nylon-6 | P.E.O.B.-P.E.T. | 2.67 | 4.8 | 70.1 | 5.4 | 24.1 | 27.1 |
| Do | Same as above. | 2.65 | 4.8 | 70.2 | 5.3 | 25.8 | 27.0 |
| Do | do | 2.68 | 4.9 | 70.2 | 5.3 | 25.0 | 28.1 |
| Nylon-66 | do | 2.47 | 5.1 | 69.7 | 5.5 | 23.2 | 32.5 |
| Do | do | 2.44 | 5.0 | 69.5 | 5.4 | 25.7 | 31.1 |
| Do | do | 2.45 | 5.2 | 69.9 | 5.5 | 25.1 | 30.8 |
| Nylon-6/nylon-66 | do | 2.68 | 4.8 | 70.1 | 5.2 | 23.3 | 25.3 |
| Do | do | 2.71 | 4.9 | 70.3 | 5.0 | 20.5 | 26.1 |
| Do | do | 2.69 | 5.1 | 69.9 | 5.0 | 21.9 | 25.0 |
| Nylon-6/6T | do | 2.67 | 5.0 | 69.7 | 5.3 | 28.0 | 24.9 |
| Do | do | 2.67 | 5.0 | 70.0 | 5.2 | 27.4 | 23.8 |
| Do | do | 2.64 | 4.9 | 70.1 | 5.5 | 24.3 | 25.0 |

[1] Of copolyester-ether in the mixed filament (percent).

What is claimed is:

1. A method for producing mixed filaments, which comprises melt blending a fiber forming polyamide component, a fiber forming polyester component containing at least 90% polyethylene terephthalate, and a fiber forming polyester-ether component, said polyester-ether component being selected from the group consisting of

(a) a self-condensate of an aromatic oxyacid or lower alkyl ester of said oxyacid, said oxyacid being or

(b) A polycondensate of aromatic dicarboxylic acids having ether linkages or lower alkyl esters of said dicarboxylic acids with glycols, said dicarboxylic acids being and (c) A copolyester-ether obtained by copolymerizing a polyester falling within the above given definition of the polyester component and a polyester-ether falling within the above given definitions (a) and (b) wherein the amount of said polyamide component is 50 to 97% based on the total weight of the mixture, and further wherein the ratio of the polyester component to the polyester-ether component is from 5/95 to 95/5 based on the weight of these components, and spinning and drawing the resultant blend.

2. The method as claimed in claim 1 wherein said amount of the polyamide component is 95–70% by weight.

3. The method as claimed in claim 1 wherein the quantitative ratio of said three components is within a range surrounded by lines connecting points A, B, C, D, E, F and G in FIG. 1 in said order.

4. The method as claimed in claim 1 wherein said ratio of the polyester component to the polyester-ether component is 5/95–95/5 (by weight).

5. The method as claimed in claim 1 wherein said ratio of the polyester component to the polyester-ether component is 10/90–90/10 (by weight).

6. The method as claimed in claim 1 wherein said polyamide component is composed of at least 90 mol percent of an aliphatic polyamide of polycaprolactam, polyhexamethylene adipamide or polyhexamethylene sebacamide.

7. The method as claimed in claim 1, wherein said polyester-ether component is self condensate of aromatic oxyacids or the lower alkyl esters thereof.

8. The method as claimed in claim 1 wherein said polyester-ether component is a polycondensate of an aromatic dicarboxylic acid having ether-linkage in the main chain or the lower alkyl esters thereof with glycol.

9. The method as claimed in claim 1 wherein said polyester-ether component is a copolyester-ether obtained by copolycondensing the starting material for forming the polyester-ether with the starting material for forming the polyester.

10. The method as claimed in claim 9 wherein said starting material for forming the polyester-ether is an aromatic oxyacid having one of the following molecular formulas or the lower alkyl esters thereof.

11. The method as claimed in claim 9 wherein said starting material for forming the polyester-ether consists of an aromatic dicarboxylic acid having ether linkage in the main chain shown by one of the following molecular formulas or the lower alkyl esters thereof and diol.

12. The method as claimed in claim 9 wherein the ratio of the acid component in the starting material for forming the polyester-ether occupied in the total acid component in the copolyester-ether is 8-95 mol percent.

13. The method as claimed in claim 9 wherein the ratio of the acid component in the starting material for forming the polyester-ether occupied in the total acid component in the copolyester-ether is 10-90 mol percent.

14. The method as claimed in claim 1 which comprises blending said three components in fine granules and melt spinning through an extruder.

15. The method as claimed in claim 1 which comprises blending said three components in fine granules and melt-spinning by means of a heat grid type melt spinning apparatus.

16. The method as claimed in claim 1 which comprises melt blending said three components by means of a melt blending device equipped with a stirrer and then effecting melt spinning.

17. The method as claimed in claim 1 which comprises effecting the melt blending at a temperature 10 to 30° C. higher than the melting point, which is maximum among said three components.

18. The method as claimed in claim 1 which comprises melt blending said three components in a water content of less than 0.1% by weight of each component.

19. The method as claimed in claim 6 wherein said polyamide component is copolyamide obtained by copolymerizing at least 90 mol percent of the polyamide referred to in claim 6 and at most 10 mol percent of different polyamide derived from a lactam, amino-carboxylic acid or nylon salt.

20. The method as claimed in claim 1, wherein said polyester component consists of at least 90 mol percent of polyethylene terephthalate unit and at most 10 mol percent of polyester unit obtained by condensing at least one diol selected from the group consisting of diethylene glycol, tetramethylene glycol and decamethylene glycol with a terephthalate.

21. The method as claimed in claim 1 wherein said polyester component consists of at least 90 mol percent of polyethylene terephthalate unit and at most 10 mol percent of polyester unit obtained by condensing at least one dibasic acid selected from the group consisting of isophthalic acid, hexahydroterephthalic acid, adipic acid, and sebacic acid with ethylene glycol.

22. A method for producing mixed filaments which consists essentially of melt blending a fiber forming polyamide component and a fiber forming polyester-ether component, wherein said polyester-ether component is selected from the group consisting of
(a) a self-condensate of an aromatic oxyacid or lower alkyl ester of said oxyacid, said oxyacid being (b) a polycondensate of aromatic dicarboxylic acids having ether linkages or lower alkyl esters of said dicarboxylic acids with glycols, said dicarboxylic acids being and
(c) a copolyester-ether obtained by copolymerizing a polyester containing at least 90% polyethylene terephthalate and a polyester-ether as defined above, the amount of said polyamide component being 50 to 97% of the total weight of the mixture, and spinning and drawing the resulting blend.

23. The method of claim 22 wherein said polyester-ether component is said self-condensate (a).

24. The method of claim 22 wherein said polyester-ether component is said polycondensate (b).

25. The method of claim 23 wherein said oxyacid is (References on following page)

References Cited

UNITED STATES PATENTS

| | | | |
|---|---|---|---|
| 3,288,755 | 11/1966 | Griehl | 260—47 |
| 3,291,778 | 12/1966 | Korematsu | 260—47 |
| 3,345,331 | 10/1967 | Reese | 260—47 |
| 3,363,027 | 1/1968 | Schnegg | 260—857 |

FOREIGN PATENTS

| | | | |
|---|---|---|---|
| 38/7,246 | 4/1961 | Japan | 260—47 |

PAUL LIEBERMAN, Primary Examiner

U.S. Cl. X.R.

260—47, 75, 78; 264—176, 210